United States Patent
Jenkins et al.

(10) Patent No.: US 9,630,144 B2
(45) Date of Patent: Apr. 25, 2017

(54) DRY CHEMICAL SCRUBBER WITH PH ADJUSTMENT

(71) Applicant: MTARRI/VARANI EMISSIONS TREATMENT, LLC, Golden, CO (US)

(72) Inventors: John Jenkins, Golden, CO (US); Frederick T. Varani, Denver, CO (US); Thomas A. Jones, Longmont, CO (US); Paul Bertram Trost, Golden, CO (US); Aaron F. Primmer, Golden, CO (US); Nathan A. Emsick, Denver, CO (US)

(73) Assignee: MTARRI/VARANI EMISSIONS TREATMENT, LLC, Golden, CO (US)

( * ) Notice: Subject to any disclaimer, the term of this patent is extended or adjusted under 35 U.S.C. 154(b) by 235 days.

(21) Appl. No.: 14/308,184

(22) Filed: Jun. 18, 2014

(65) Prior Publication Data

US 2014/0369909 A1    Dec. 18, 2014

Related U.S. Application Data

(60) Provisional application No. 61/836,547, filed on Jun. 18, 2013, provisional application No. 61/836,562, filed on Jun. 18, 2013.

(51) Int. Cl.
| | | |
|---|---|---|
| *B01D 47/00* | (2006.01) | |
| *B01D 53/85* | (2006.01) | |
| *B01D 53/52* | (2006.01) | |
| *B01D 53/82* | (2006.01) | |
| *B01D 53/96* | (2006.01) | |
| *B01D 53/72* | (2006.01) | |

(52) U.S. Cl.
CPC ............. *B01D 53/85* (2013.01); *B01D 53/52* (2013.01); *B01D 53/82* (2013.01); *B01D 53/96* (2013.01); *B01D 53/72* (2013.01); *B01D 2251/304* (2013.01); *B01D 2251/404* (2013.01); *B01D 2251/604* (2013.01); *B01D 2251/606* (2013.01); *B01D 2253/102* (2013.01); *B01D 2253/108* (2013.01); *B01D 2253/11* (2013.01); *B01D 2253/1124* (2013.01); *B01D 2255/20738* (2013.01); *B01D 2257/00* (2013.01); *B01D 2257/304* (2013.01); *B01D 2257/408* (2013.01); *B01D 2257/556* (2013.01); *Y02E 50/346* (2013.01)

(58) Field of Classification Search
None
See application file for complete search history.

(56) References Cited

U.S. PATENT DOCUMENTS

| | | | |
|---|---|---|---|
| 3,907,523 A | * | 9/1975 | Melin, Jr. ............ B01D 53/501 422/170 |
| 5,861,303 A | | 1/1999 | Barshter et al. |
| 8,318,476 B2 | | 11/2012 | Parker et al. |
| 2007/0259416 A1 | | 11/2007 | Parker et al. |

(Continued)

*Primary Examiner* — Jennifer A Smith
*Assistant Examiner* — Anita Nassiri Motlagh
(74) *Attorney, Agent, or Firm* — Holzer Patel Drennan

(57) ABSTRACT

Implementations disclosed herein provide a dry chemical scrubber with a pH regulator that adjusts an internal pH value of the dry chemical scrubber by adding high pH elements to the contents of the dry chemical scrubber on a continuous or periodic basis.

19 Claims, 5 Drawing Sheets

(56) References Cited

U.S. PATENT DOCUMENTS

2009/0074642 A1* 3/2009 Maramchik ............ F23J 15/003
                                                          423/215.5
2009/0081093 A1* 3/2009 Comrie ................ B01D 53/508
                                                          423/219

* cited by examiner

DRY CHEMICAL SCRUBBER WITH PH ADJUSTMENT

CROSS-REFERENCE TO RELATED APPLICATIONS

This application claims the benefit of U.S. Provisional Application No. 61/836,547 filed Jun. 18, 2013, and to U.S. Provisional Application No. 61/836,562 filed Jun. 18, 2013, the entire contents of which are incorporated herein by reference for all purposes.

BACKGROUND

Compound gas streams containing acid gases can be treated with dry chemical scrubber systems. Dry chemical scrubbers remove or reduce the acid components from such streams by converting, through chemical reaction, the acid gases into other compounds.

SUMMARY

Implementations of the dry chemical scrubber described herein provide for an automatic pH adjustment system for a dry chemical scrubber on a continuous or periodic basis to regulate the pH within the dry chemical scrubber to within a predetermined range. Such pH regulation slows the rate at which the reactive chemicals (generally known as "media") within the dry chemical scrubber are consumed, and extend the time between media changes reducing operating and maintenance costs of the dry chemical scrubber system.

This disclosure provides, in one implementation, a gas treatment system comprising a dry chemical scrubber configured to hold media therein to remove acid gas from an incoming gaseous fluid stream, and a passive pH regulator operably connected to the dry chemical scrubber to regulate the pH of content within the dry chemical scrubber. In some implementations, the pH of the water used to moisten the media in the dry chemical scrubber is regulated.

This disclosure also provides a gas treatment system comprising a dry chemical scrubber having an internal volume with media therein, the media configured to react with acid gas; a gaseous fluid stream input into the scrubber in fluid communication with the internal volume upstream from the media; a liquid input into the scrubber in fluid communication with the internal volume upstream from the media; a gaseous fluid stream output from the scrubber downstream of the media; a liquid output from the scrubber; a recirculation line connecting the liquid output to the liquid input; and a pH regulator operably connected to the internal volume of the dry chemical scrubber that passively adjusts pH of content within the dry chemical scrubber.

This disclosure further provides a method that includes receiving an input gas stream in a dry chemical scrubber configured to hold media to remove acid gas from the input gas stream, receiving a water source in the dry chemical scrubber, adjusting a pH level of one or both of the input gas stream and the water source with a pH regulator, and after adjusting the pH level, reacting the acid gas with the media.

This disclosure provides another method that includes receiving an input gas stream at a dry chemical scrubber configured to hold media to remove acid gas from the input gas stream, the dry chemical scrubber including at least two media layers, each of the at least two media layers separated from one another by a plenum layer; and distributing high pH elements through each of at least two distribution ports, each distribution port dispensing the high pH elements into a different one of the at least two media layers.

This disclosure also provides a gas treatment system comprising a dry chemical scrubber coupled to a gas stream and configured to hold media to remove acid gas from the gas stream, each of the at least two media layers separated from one another by a plenum layer; and a pH regulator including at least two distribution ports, each distribution port configured to dispense high pH elements into a different one of the at least two media layers.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

A further understanding of the nature and advantages of the present technology may be realized by reference to the figures, which are described in the remaining portion of the specification.

DETAILED DESCRIPTION

Figure 1:
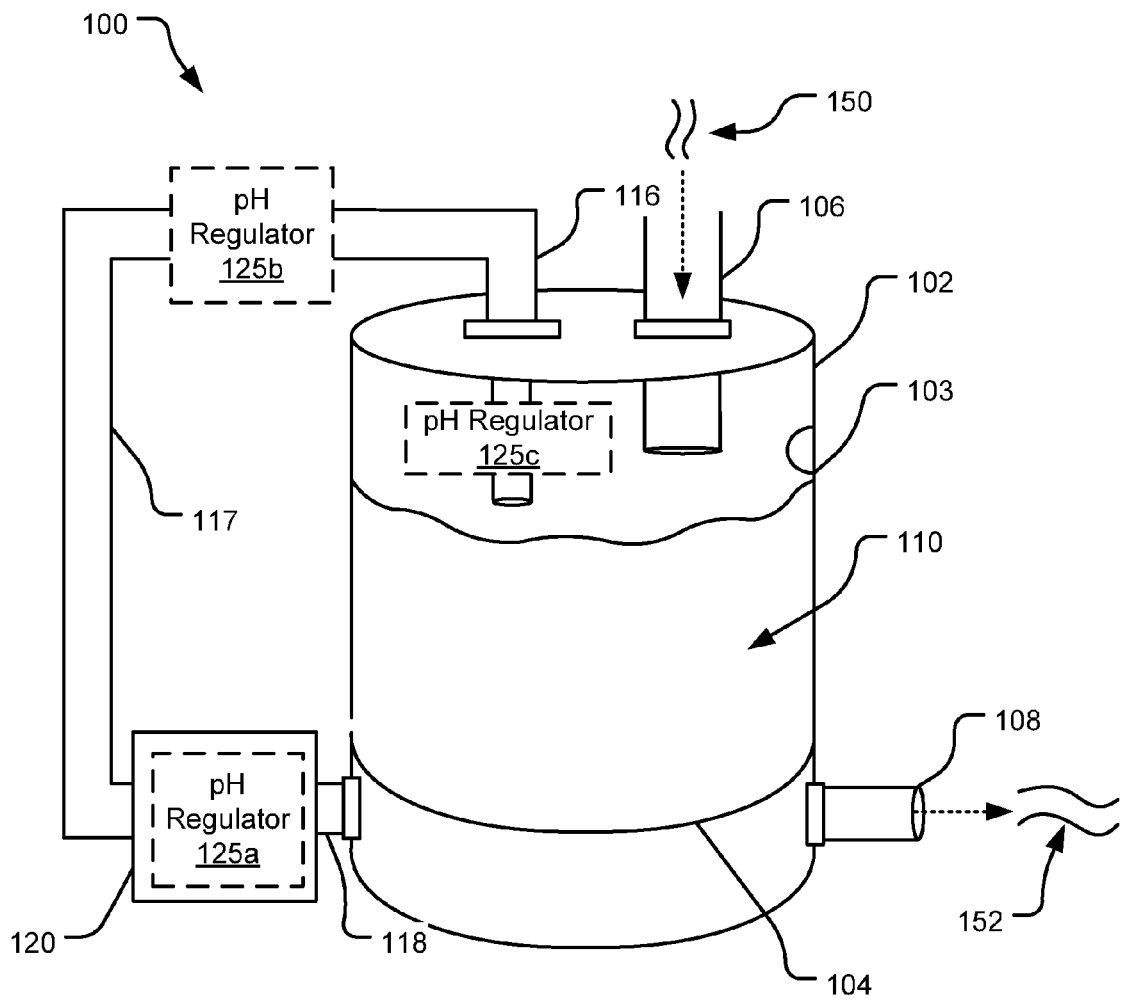
FIG. 1 is a schematic perspective view of an example dry scrubber with at least one pH regulator.

Dry chemical scrubbers can be engineered to reliably deliver low outlet acid gas concentrations under a wide range of fluctuating inlet gas conditions. However, dry chemical scrubbers consume chemicals that need to be replenished periodically. Replacing such chemicals can require specialized equipment and entail high maintenance costs. Accordingly, slowing the rate at which such chemicals are consumed can lower associated operating and maintenance costs.

Some dry chemical scrubbers rely on iron hydroxide to neutralize acid gases (e.g., hydrogen sulfide ($H_2S$), hydrogen selenide ($H_2Se$), etc.) and/or non-acid gases such as mercaptan and other sulfur-containing compounds (e.g., carbon disulfide ($CS_2$), etc.) in the incoming gas stream. However, the effectiveness of the acid-removal chemicals in such scrubbers decreases sharply if the pH in the dry chemical scrubber (e.g., of either the gas, the iron hydroxide, or other component) falls outside of a set pH range. Accordingly, one way to slow the rate at which the chemicals are consumed is to regulate internal pH values in such systems. The implementations disclosed herein provide pH regulation systems and techniques useful in optimizing chemical life-times in dry chemical scrubber systems.

As used herein, a "dry" chemical scrubber is a chemical scrubber that utilizes a solid media (e.g., iron sponge) to present select chemical elements or compounds designed to react with and reduce acid gas in a gas stream. A dry chemical scrubber, although including the term "dry", commonly has liquid components present therein. For example, the acid-removal media in a dry scrubber is moistened or wetted by water or other liquid elements that are distributed on or recirculated through the media; presence of the water on the media improves the effectiveness of the adsorption of the acid gas by the media. Additionally, the term "acid gas" is generally used herein to refer to gases that contain chemical elements or compounds of a type such that when the gas is exposed to water or water vapor, an acid is formed; or, that contain water in vapor form that if condensed would yield a measured acidic pH, i.e., of less than 7. A "gaseous fluid stream" encompasses gas streams including gas streams with entrained water or other liquid, with the liquid being an aerosol, droplet, particulate, or the like carried by the gas stream.

In the following description, reference is made to the accompanying drawing that forms a part hereof and in which are shown by way of illustration at least one specific embodiment. The following description provides additional specific embodiments. In some instances, a reference numeral may have an associated sub-label consisting of a lower-case letter to denote one of multiple similar components. When reference is made to a reference numeral without specification of a sub-label, the reference is intended to refer to all such multiple similar components.

It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

FIG. 1 illustrates an example dry chemical scrubber system 100 with examples of pH regulators. The dry scrubber system 100 is a down-flow system having a tank 102 with an internal volume 103; the term "down-flow" and variants thereof means that at least the acid-gas stream flows in a generally downward direction. Present within the tank 102 is a layer of media 110 supported by a screen 104. A first inlet 106 is configured to provide a gas stream 150 (e.g., byproduct gas) into the tank 102 near the top of the tank 102; any number of valves, diverters, baffles or other equipment may be present at or near the inlet 106. A first outlet 108 downstream of the inlet 106 is configured to remove the gas stream, at this stage, as an at least partially de-acidified gas stream 152, from the tank 102.

The tank 102 also includes a second inlet 116 configured to provide a liquid (e.g., water) stream into the tank 102 near the top of the tank 102; any number of valves, diverters, baffles or other equipment may be present at or near the inlet 116. A second outlet 118, downstream of the second inlet 116, is configured to remove the liquid stream from the tank 102. In the particular implementation of system 100, a liquid recirculation or recycle line 117 connects the outlet 118 to the inlet 116. Proximate the outlet 118 is a sump 120; in some implementations, the sump 120 may be present within the tank 102, downstream of the screen 104 supporting the media 110.

In some implementations, a plenum or plenum layer may be present in the dry chemical scrubber 100 downstream of the gas inlet 106. A plenum or plenum layer is a gas distribution layer in fluid communication with the inlet 106 and the media layer 110; in some implementations, the plenum or plenum layer includes a gas-permeable dividing mechanism such as a baffle plate, or a layer of rock, gravel, or other material having porous passageways that assist in radially dispersing gases across the media layer 110.

An increasing pressure differential near the top of the tank 102 forces the gas stream 150 down through the media 110 in the tank 102 until it exits the dry scrubber at outlet 108. While moving through the media 110, acidic compounds in the gas stream 150 react with chemicals within the media 110 to at least partially de-acidify the gas and create a non-gas byproduct. In one exemplary implementation, the media 110 is a wood substrate impregnated with iron hydroxide (e.g., an "iron sponge"). In use, the iron hydroxide reacts with hydrogen sulfide ($H_2S$) and other acids in the gaseous stream to create pyrite or a pyrite-type compound. In other implementations, the media 110 is or includes, without limitation, standard plastic packing, wood chips impregnated with other basic material such as sodium carbonate, sodium bicarbonate, zeolite(s) optionally impregnated or coated with iron and/or oxides, clay coated with iron and/or oxides. As a result of the reaction between the acidic compounds in the gas stream 150 and the media 110, some or all of the acidic compounds are removed from the gas stream 150 to result in gas stream 152.

A higher pH at the media 110 results in higher removal of $H_2S$ from the gas stream 150. For example, the solubility of $H_2S$ in water (or in moist media) is greater when the pH is above 7 than if the pH is less than 7. As another example, the solubility of the $H_2S$ at pH 8 is approximately twice the solubility at pH 7.

The screen 104 supporting the media 110 may be any suitable porous structure, such as a diffuser plate, gas-permeable cloth, or other media-supporting dividing mechanism. The area below the screen 104 may be an empty containment area or may have any number of possible elements therein, such as baffles, flow directors, additional fluid treatment elements, etc. After the gas stream passes through the media layer 110 and the screen 104, the gas stream exits the tank 102 as the gas stream 152 through the outlet 108 near the base of the tank 102.

In at least one implementation, water is also formed in the reaction between the acidic compounds and the media 110. The water may partially vaporize to form a gaseous product or may remain liquid. Vaporized water exits the tank 102 via the outlet 108 and liquid water exits via the outlet 118; in some implementations, droplets or aerosol of water may be present in the gas stream 152 leaving via the outlet 108.

The dry chemical scrubber 100 further includes a pH regulator 125 that adjusts the pH of content within the tank 102 of the dry chemical scrubber 100. As used herein, "content" includes the media 110 as well as any gases or liquids contained within the tank 102. The pH regulator 125 inhibits the pH of the contents of the tank 102 from dropping below a predetermined optimal pH value or pH range, which corresponds with an optimal operating efficiency of the dry chemical scrubber 100. The predetermined optimal pH values or ranges depend largely upon system design and performance criteria; therefore, optimal pH ranges may vary in value and breadth from one system to another. However, in one implementation, a high pH value (e.g., a pH that is at or above pH 7, and in some implementations a pH that is at or above pH 8) corresponds with an optimal operating efficiency of the dry chemical scrubber 100. In another implementation, the pH regulator 125 regulates the pH of contents of the tank 102 to between pH 8 and pH 10.

To regulate the pH of contents within the tank 102, the pH regulator 125, having pH elements, increases the pH of the contents of the tank 102. The high pH elements may be in liquid, solid, or gas form. The high pH elements may be added to the contents of the tank 102 in their original form (i.e., as liquid, solid or gas), or may be converted to a different form, for example, solid elements can be dissolved in a liquid, gaseous elements can be bubbled into a liquid, etc.

In one implementation, the high pH elements (e.g., calcium, sodium carbonate, sodium hydroxide, ammonia, etc.) are included in an aqueous solution or mixture, formed by dissolving or mixing the high pH elements in a liquid; this liquid pH material then can be continuously or periodically added to the contents of the tank 102. The aqueous high pH materials may be added directly to the contents within the tank 102; for example, the aqueous solution may be added to the tank contents using a bleed line leading into the tank 102 under a slight positive pressure. Alternately, the aqueous high pH material may be added to any of the contents outside of the tank 102; for example, the aqueous material may be added to the gas stream 150 or to the recycle water line 117.

In another implementation, high pH elements can be converted to a gaseous high pH material, such as a vapor, and injected into the contents of the tank 102. For example, the gas stream 150 can be passed through a bed or column packed with particulate high pH elements, such as calcium carbonate, forming a gaseous or vapor high pH material prior to or upon entering the tank 102 (before contacting the media 110).

In FIG. 1, three alternate locations of the pH regulator 125 are shown: pH regulator 125a is shown within the sump 120, pH regulator 125b is shown within the liquid recycle line 117, and pH regulator 125c is shown within the tank 102. When the pH regulator is located in any of these locations, the high pH elements present within the pH regulator 125 are in fluid communication with the contents of the tank 102, and the high pH elements are configured to adjust the pH of the contents of the tank 102.

The high pH elements have a pH of at least 7, and in some implementations have a pH of at least 8, and in other implementations have a pH of at least 10. Non-limiting examples of the high pH elements include calcium carbonate, soda ash, sodium bicarbonate, magnesium hydroxide and limestone. Limestone may be, for example, in rock form, in granular or gravel form (e.g., crushed or granulated), or powdered.

When the high pH elements are solid elements, such as rocks or granules, a plurality of the elements can be provided as a packed bed, or can be packaged together, such as in a basket or netting, which can be conducive to removing spent elements from the pH regulator 125 and placing new elements therein. The high pH elements should be selected to provide a high available surface area to the liquid stream. For the pH regulator 125c within the tank 102, the tank 102 can have a hatch at the top to allow access to the pH regulator 125c in the interior 103, or the entire top of the tank 102 can be removable to allow access to the interior 103 of the tank 102.

The pH regulator 125, in some implementations, is a passive system, automatically adjusting the pH of the fluid (i.e., gas or liquid) flowing through the pH regulator 125. The three locations of the pH regulators 125a, 125b, 125c of the implementation of FIG. 1 are all in the liquid (water) system of the system 100; in particular, the pH regulator 125a is in the sump 120, the pH regulator 125b is within the liquid recycle line 117, and pH regulator 125c is in the water line within the tank 102. As such, the water in system 100 flows through the pH regulator 125 prior to wetting the media 110 in the tank 102.

The pH regulator 125 is a passive system that adjusts the pH level of the water without interaction or input by a person (e.g., an operator); no sensors, valves, regulators, diverters, etc. are needed to control the flow of the water through the pH regulator 125 nor to activate or deactivate the pH regulator 125. The pH regulator 125 functions on a pH equilibrium theory, with the pH regulator 125 automatically adjusting the pH level of the water flowing through it, if needed. As an example, if the high pH elements in pH regulator 125 have a pH of 10, and if the initial pH of the liquid passing through the pH regulator 125 is less than 10, the high pH elements in regulator 125 will raise the pH of the liquid to above the initial pH, but less than 10, as the liquid passes through the pH regulator 125. If the initial pH of the liquid passing through the pH regulator 125 is at or greater than 10, the high pH elements in regulator 125 will not raise the pH of the liquid. It should be understood that the pH level of the liquid may not be raised as high as the pH of the high pH elements, but the pH level of the liquid will be raised as the liquid passes through the pH regulator 125.

The dry chemical scrubber system 100 may optionally include one or more sensors or condition-regulator tools such as a pH sensor, temperature sensor or regulator, pressure sensor or regulator, irrigation source, etc., but as indicated above, such equipment is not needed for the pH regulator 125. Additionally, the dry chemical scrubber 100 may include a controller (not shown) for actuating valves and pumps that pull the gas into and out of the tank 102. In one implementation, a dehydration unit (not shown) preconditions the gas stream 150 before it enters the tank 102 or before it is distributed within the tank 102. The dehydration unit removes fluids from the gas stream 150 to ensure that moisture content within the dry chemical scrubber 100 is capped below a predetermined level.

In some implementations, the media 110 may be mixed with high pH materials such as limestone and soda ash (i.e., calcium and sodium carbonate) before it is placed within the tank 102. Such mix-ins can help to stabilize the pH of the media 110 and associated fluids within the dry chemical scrubber 100. The pH regulator 125 extends the life of these mix-ins and may periodically replenish the high pH materials as they are used up.

Figure 2:
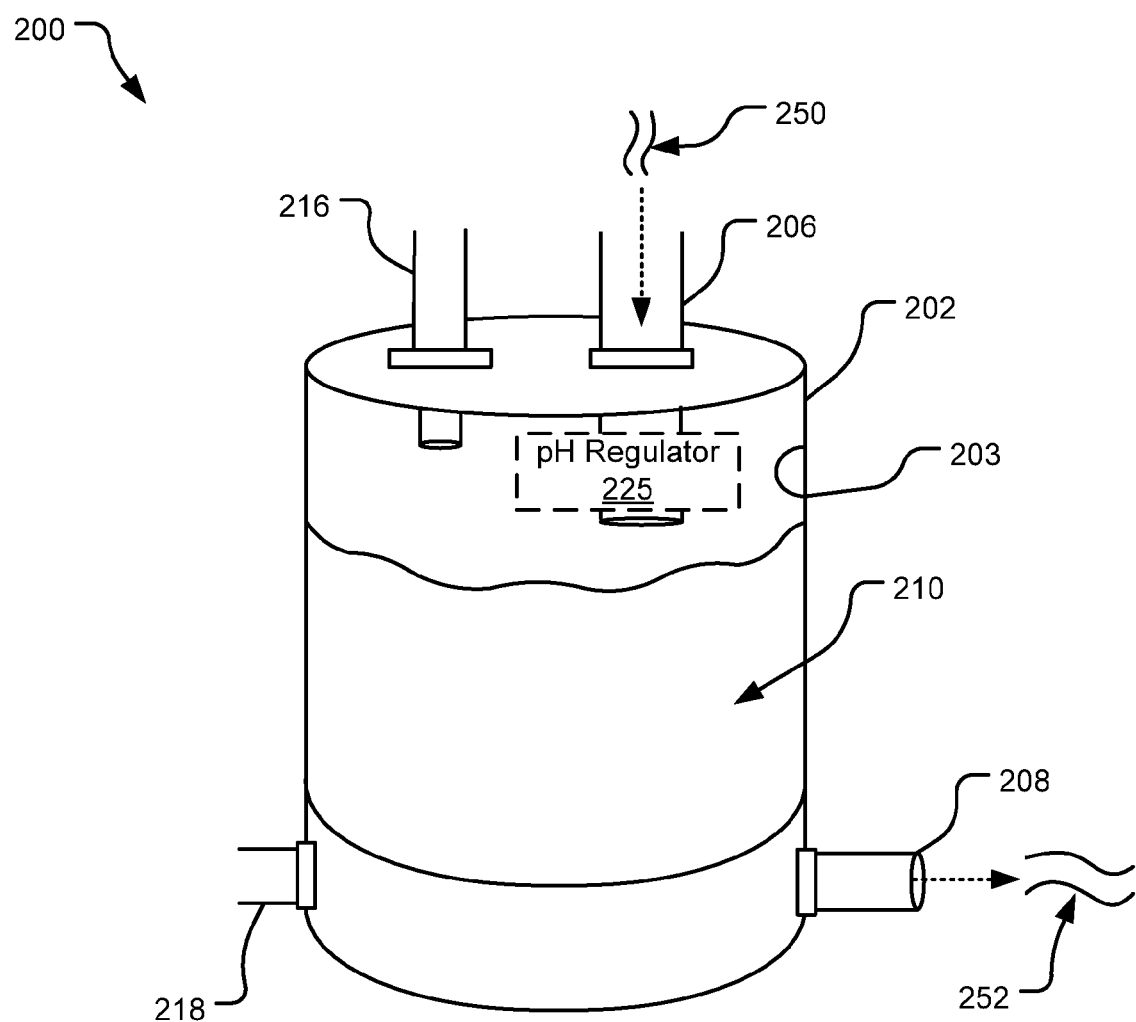
FIG. 2 is a schematic perspective view of another example dry scrubber with a pH regulator.

As mentioned above, high pH elements can be converted to a gaseous high pH material, such as a vapor, and injected into the contents of the tank. FIG. 2 illustrates another example downflow dry chemical scrubber 200 with a pH regulator; in this implementation of the dry chemical scrubber 200, the pH regulator is positioned and configured to regulate the pH of the inlet gas stream.

The dry scrubber system 200 has a tank 202 with a layer of media 210. A first inlet 206 is configured to provide a gas stream 250 (e.g., byproduct gas) into the tank 202 near the top of the tank 202. A first outlet 208 is configured to remove the gas stream, at this stage an at least partially de-acidified gas stream 252, from the tank 202. The tank 202 also includes a second inlet 216 configured to provide a liquid (e.g., water) stream into the tank 202 near the top of the tank 202. A second outlet 218 is configured to remove the liquid stream from the tank 202.

The dry chemical scrubber 200 further includes a pH regulator 225 that adjusts the pH of content within the tank 202 of the dry chemical scrubber 200. As used herein, "content" includes the media 210 as well as any gases or liquids contained within the tank 202. The pH regulator 225 inhibits the pH of the contents of the tank 202 from dropping below a predetermined optimal pH value or pH range, which corresponds with an optimal operating efficiency of the dry chemical scrubber 200. To regulate the pH of contents within the tank 202, the pH regulator 225, having pH elements, increases the pH of the contents of the tank 202. The high pH elements may be in liquid, solid, or gas form. The granule or particle size distribution of solid high pH elements should be selected to provide a high available surface area to the gas stream and to inhibit unacceptable pressure drop thereacross.

In this implementation, the inlet gas stream 250 passes through the pH regulator 225 present within the tank 202. In an alternate implementation, the pH regulator is positioned outside of the tank 202 yet in fluid communication with the inlet gas stream 250.

The pH regulator 225 of FIG. 2 can be a passive system that adjusts the pH level of the inlet gas stream 250 without interaction or input by a person (e.g., an operator); no sensors, valves, regulators, diverters, etc. are needed to control the flow of the gas stream through the pH regulator 225 nor to activate or deactivate the pH regulator 225. The pH regulator 225 functions on a pH equilibrium theory, with the pH regulator 225 automatically adjusting the pH level of the gas stream flowing through it, if needed. In some implementations, the dry chemical scrubber 200 may include pH monitoring, which can be used to affect the pH regulator 225 and its adjustment or regulation of the pH of the contents of the tank 202.

The pH elements in the pH regulator 225 have a pH that is greater than the input gas stream 250, which, because the input gas stream contains acid gas, generally has a pH less than 7. Thus in some implementations, pH elements having a pH less than 7 can be used for the pH regulator 225, although high pH elements can additional or alternately be used. As an example, if the pH elements in pH regulator 225 have a pH of 6, and if the initial pH of the input gas stream 250 passing through the pH regulator 225 is less than 6, the pH elements in the pH regulator 225 will raise the pH of the gas stream to above the initial pH, but less than 6, as the gas passes through the pH regulator 225. If the initial pH of the gas passing through the pH regulator 225 is at or greater than 6, the pH elements in regulator 225 will not raise the pH of the gas. It should be understood that the pH level of the gas may not be raised as high as the pH of the pH elements, but the pH level of the gas will be raised as the gas passes through the pH regulator 225.

Figure 3:
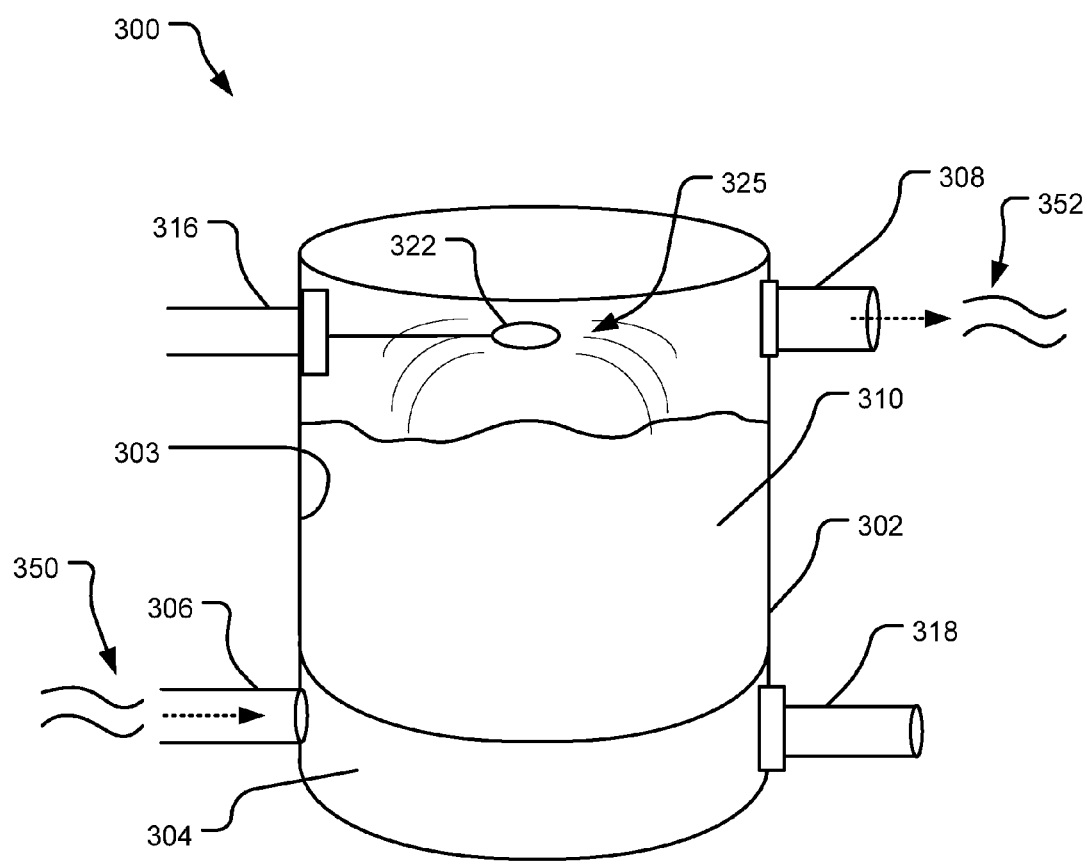
FIG. 3 is a schematic perspective view of yet another example dry scrubber with a pH regulator.

FIG. 3 illustrates another example dry chemical scrubber 300 with a pH regulator; this implementation of the dry chemical scrubber 300 is an up-flow system, in which the acid-gas stream to be treated has a generally upward flow. The dry chemical scrubber 300 may also be referred to as a counter-current system, having the acid-gas stream flowing generally from the bottom to the top of the scrubber 300 and a liquid or water stream flowing generally from the top to the bottom of the scrubber 300.

Dry chemical scrubber 300 has a tank 302 with an interior volume in which is a plenum layer 304 physically below, and optionally supporting, a layer of media 310. A first inlet 306 is configured to provide a gas stream 350 (e.g., byproduct gas) into the tank 302 near the bottom of the tank 302. A first outlet 308 is configured to remove the gas stream, at this stage a de-acidified gas stream 352, from the tank 302 (e.g., at the top of the tank 302); it is noted that although the outlet 308 is physically positioned above the inlet 306, the outlet 308 is downstream of the inlet 306; similarly, the inlet 306 is upstream of the plenum layer 304, which is upstream of the media 310. The tank 302 also includes a water source 316 configured to provide a liquid (e.g., water) into the tank 302. A second outlet 318 is configured to remove the liquid from the tank 302.

The acid gas stream 350 is fed via the inlet 306 into the plenum layer 304, where the gas is radially distributed in a substantially even manner about the interior volume 303 of the tank 302. After entering the plenum layer 304, the gas stream 350 flows upward, passing through and reacting with the media 310. The reacted gas stream 352 exits the vessel through the outlet 308 near the top of the tank 302, which may be selectively opened and closed.

The dry chemical scrubber 300 further includes a pH regulator 325, integrated with the water source 316. The pH regulator 325 adds high pH elements (e.g., carbonate materials) to the environment within the dry chemical scrubber 300, either continuously or periodically. The quantity of the high pH elements added with each addition may vary based on pH sensor readings within the tank 302. Such periodic or continuous addition of high pH elements to the dry chemical scrubber 300 can improve the operating life of the media 310 as compared to a system that utilizes a single, one-time addition of high pH elements to the media 310 (such as an initial mixing of high pH elements with the media). In one implementation, the high pH elements are added at predetermined time intervals. In another implementation, the high pH elements are added in response to a pH sensor measurement.

In FIG. 3, the pH regulator 325 is integrated with water source 316 and an irrigation system 322 that is periodically engaged to re-moisten the media 310. In one implementation, high pH elements (e.g., carbonate materials) are periodically added to the liquid (water) being sprayed on to the media 310; excess and/or used liquid exits the tank 302 via the outlet 318. In another implementation, high pH elements are periodically added to a recirculating sump (not shown) of the dry chemical scrubber 300, and circulated through the tank 302 via the irrigation system 322 or other circulation mechanism. In yet another implementation, the high pH elements are stored in a concentrated form in a compartment of the pH regulator 325 and added to the water as needed.

In yet another implementation, high pH elements are added to the tank 302 by a distribution mechanism that is not part of an irrigation system. For example, gaseous vapors infused with high pH elements may be injected into the tank 302 via one or more distribution lines (not shown). Alternatively, solid particulate materials may be periodically added by a distribution mechanism.

Figure 4:
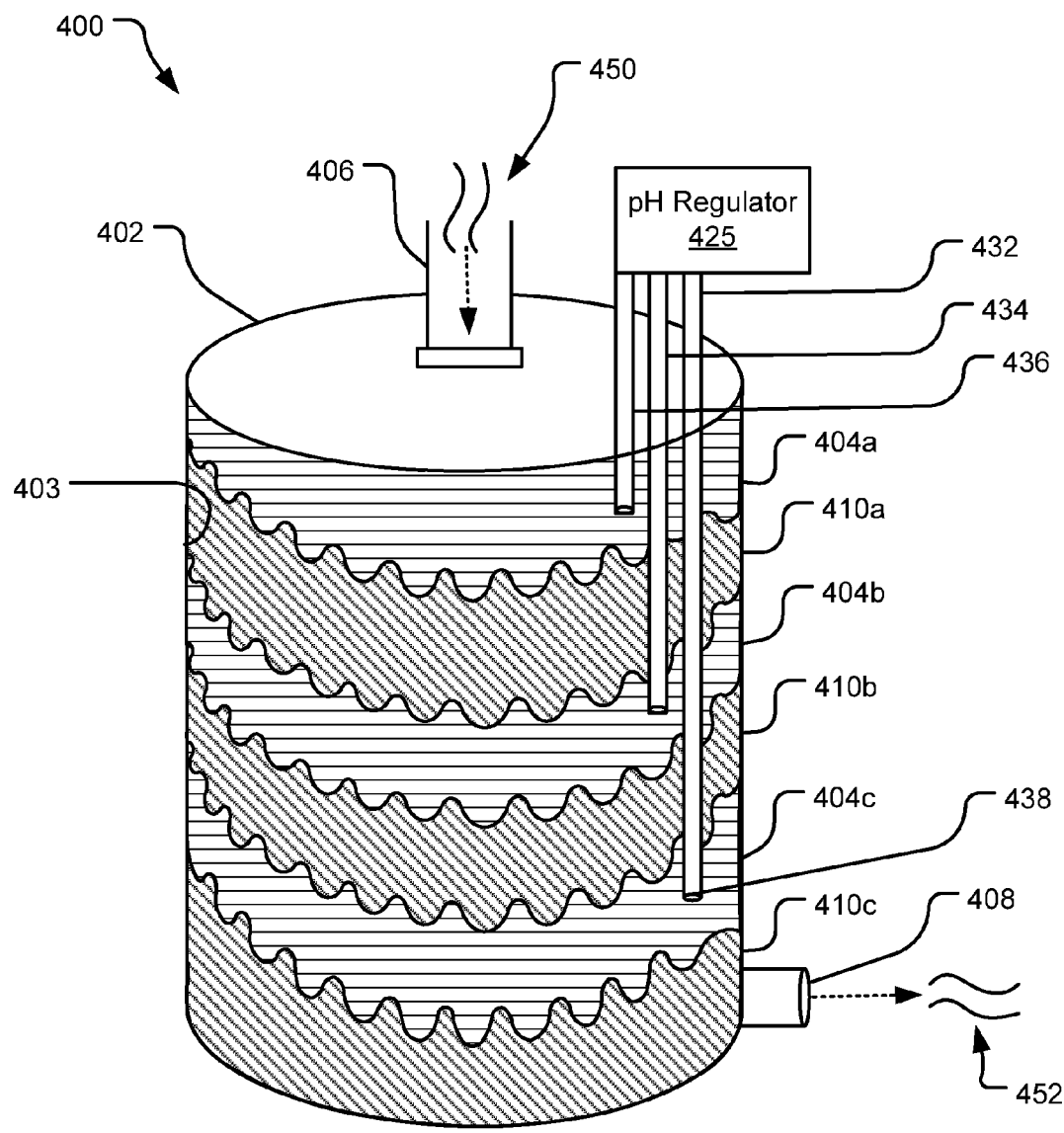
FIG. 4 is a schematic perspective view of another example dry scrubber with a pH regulator.

FIG. 4 illustrates another example dry chemical scrubber 400 with a pH regulation mechanism; this implementation of the dry chemical scrubber 400 is a multilayer scrubber. The dry chemical scrubber 400 includes a tank 402 having an interior volume 403 with three different layers of media 410a, 410b, and 410c interspersed between plenum layers 404a, 404b, and 404c. Each of the media layer 410 and the plenum layers 404 is in fluid communication with each of the other media layers 410 and plenum layers 404.

In one implementation, netting (e.g., open-meshed fabric that is twisted, knotted, or woven together) or other porous packaging is positioned between each of the media layers 410 and the corresponding adjacent plenum layer 404 respectively, to aid in removal and replacement of used media, for example, through a removable hatch at the top of the tank 402. Additionally, such packaging provides a delineation between media layers 410 and plenum layers 404.

The tank 402 has an inlet 406 configured to provide a gas stream 450 (e.g., byproduct gas) into the tank 402 and an outlet 408 to remove the gas stream, at this stage, an at least partially de-acidified gas stream 452, from the tank 402.

The gas stream 450 is fed into the tank 402 and forced downward, by a pressure differential, through each of the alternating media layers 410 and plenum layers 404 below. The plenum layers 404 may include material with porous passageways (e.g., gravel, rock fragments, or another loosely packed substance) through which the gas stream 450 can travel outward radially and downward toward the base of the tank 402. In other implementations, one or more of the plenum layers 404 includes a gas containment cavity separated from an adjacent media layer 410 by a diffuser plate; a diffuser plate has holes sized and spaced to provide for an even radial distribution of gas across a surface of the diffuser plate before the gas passes through the diffuser plate. The inclusion of these plenum layers 404 reduces the likelihood of the gas stream "channeling" (following a continuous, local path of least resistance) through the media—an effect that reduces dramatically the effective utilization of all of the media 410 in the tank 402.

A pH regulator 425 adjusts the pH of contents within the tank 402 by continuously or periodically adding high pH elements to each of the media layers 410 by way of distribution ports (e.g., a distribution port 438 shown in plenum layer 404c, which will then distributed into media layer 410c) at the bottom of each of three distribution lines 432, 434, and 436. The distribution lines 432, 434, 436 feed into the plenum layers 404a, 404b, 404c, respectively; in alternate implementations, the distribution lines 432, 434, 436 feed into the media layers 410a, 410b, 410c, respectively. By having the distribution lines 432, 434, 436 feed into the plenum layers 404, it reduces the likelihood of the high pH elements "channeling" (following a continuous, local path of least resistance) through the media layers 410.

In one implementation, the distribution lines 432, 434, 436 disperse a liquid buffer solution that moistens the media and includes one or more high pH additives (e.g., calcium, sodium carbonate, sodium hydroxide, ammonia, etc.). The high pH elements may be mixed into the liquid buffer solution within a liquid sump, reservoir of the pH regulator, or other mechanism inside or outside of the tank 402. In another implementation, the distribution lines 432, 434, and 436 disperse gaseous vapor including high pH elements.

Because the distribution lines 432, 434, and 436 each feed a separate layer of media (i.e., media layers 410a, 410b, 410c, respectively), the pH of each of the media layers 410 can be tuned individually, as needed. Additionally, such layering allows for a more even distribution of high pH elements throughout the tank 402 than a distribution achieved when the dry chemical scrubber system includes a single high pH element distribution source.

In FIG. 4, three distribution lines are illustrated; however, any number of distribution lines or distribution ports is contemplated. In one implementation, more than one distribution line may distribute high pH elements to a single layer of media to provide for more uniform distribution of the high pH elements. In another implementation, a distribution line includes multiple distribution ports that distribute high pH elements to a single layer of media.

Any of the dry chemical scrubbers discussed above, and variations thereof, can be utilized in an acid-gas removal system that includes a dry chemical scrubber, a pH regulator, and another acid-gas removal apparatus, such as a biological scrubber. As an example, a hybrid scrubber system includes a biological scrubber fluidly connected to a dry chemical scrubber with a regulated pH value (e.g., by a pH regulator as described above). An acid-gas stream is directed into the biological scrubber, where bacteria within the biological scrubber consume acid gas to reduce the amount of the acid gas present in the gas stream. In some implementations, the biological scrubber may reduce concentrations of the acid gas by as much as 60-70 percent. After treatment within the biological scrubber, the gas is passed through a pH-regulated dry chemical scrubber. Such hybrid systems can be used to satisfy low level and/or "bright-line" acid gas limits (e.g., industrial equipment limits, warranty limits, utility pipeline limits or regulatory authority restrictions) at a significant operating cost reduction as compared to other acid gas treatment systems, including dry chemical scrubbers, when used alone.

Figure 5:
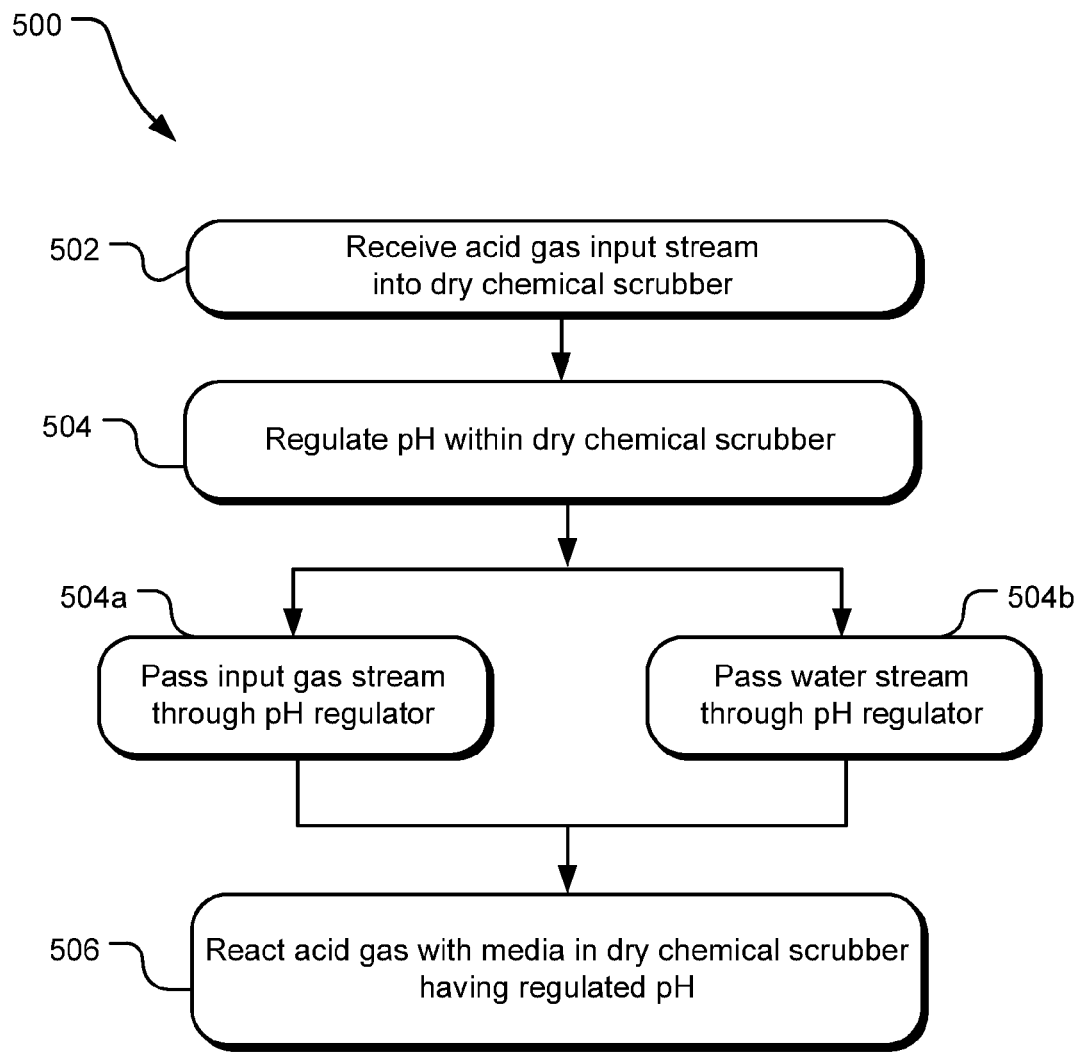
FIG. 5 is a flow diagram of example operations for gas treatment using a dry chemical scrubber system having a pH regulator.

FIG. 5 illustrates example process 500 for removing at least an amount of acid gas from a gas stream using an example dry chemical scrubber system having a pH regulator. A receiving operation 502 receives an input gas stream into a dry chemical scrubber. The scrubber includes media to react with acid in the input gas stream and a water stream to moisten the media.

An adjustment operation 504 regulates the pH of the contents within the pH scrubber; the contents including the media, the acid gas stream, and liquid (water). In one implementation, operation 504a, the acid gas input stream is passed through the pH regulator. In another implementation, operation 504b, the water stream is passed through the pH regulator.

A reaction operation 506 reduces the acid in the gas stream by reacting the acid gas with the media in the dry chemical scrubber. Because of the regulated pH within the contents of the dry chemical scrubber, the media retains is useful life for a longer period.

The above specification, examples, and drawings provide a complete description of the structure and use of exemplary implementations of the invention. Since many implementations of the invention can be made without departing from the spirit and scope of the invention, the invention resides in the claims hereinafter appended. It is understood that the features of any of the implementations discussed above may be rearranged without departing from the spirit and scope of the invention. Furthermore, structural features of the different implementations may be combined in yet another implementation without departing from the recited claims.

What is claimed is:

1. A gas treatment system comprising:
   a dry chemical scrubber configured to support solid media on a plenum therein to remove acid gas from an incoming gaseous fluid stream; and
   a passive pH regulator comprising high pH elements operably connected to the solid media within the dry chemical scrubber, the passive pH regulator regulating pH of content within the dry chemical scrubber; wherein the pH regulator is fluidly connected to a liquid line to dispense a liquid solution or mixture comprising the high pH elements.

2. The gas treatment system of claim 1, wherein the liquid solution or mixture has a pH of at least 8.

3. The gas treatment system of claim 2, wherein the liquid solution or mixture has a pH of 8 to 10.

4. The gas treatment system of claim 1, wherein the pH regulator is fluidly connected to a liquid recycle line to dispense a liquid solution or mixture comprising the high pH elements.

5. A gas treatment system comprising:
a dry chemical scrubber having an internal volume with solid media packed therein, the media configured to react with acid gas;
a gaseous fluid stream input into the scrubber in fluid communication with the media;
a liquid input into the scrubber in fluid communication with the media;
a gaseous fluid stream output from the scrubber downstream of the media;
a liquid output from the scrubber;
a recirculation line connecting the liquid output to the liquid input; and
a pH regulator operably connected to the internal volume of the dry chemical scrubber that passively adjusts pH of content within the dry chemical scrubber.

6. The gas treatment system of claim 5 further comprising a sump in fluid communication with the liquid output and the recirculation line, and wherein the pH regulator is within the sump.

7. The gas treatment system of claim 5, wherein the pH regulator is within the recirculation line.

8. The gas treatment system of claim 5, wherein the pH regulator is within the internal volume of the dry chemical scrubber.

9. The gas treatment system of claim 5, wherein the pH regulator includes high pH elements having a pH greater than 8.

10. The gas treatment system of claim 5, wherein the pH regulator includes high pH elements comprising calcium carbonate, soda ash, sodium bicarbonate, or limestone.

11. The gas treatment system of claim 10, wherein the high pH elements comprise crushed limestone or rock limestone.

12. The gas treatment system of claim 5, wherein the pH regulator comprises high pH elements removable and replaceable from the pH regulator.

13. A method comprising:
providing a dry chemical scrubber having solid media retained on a plenum therein;
receiving an input gas stream into the dry chemical scrubber, the media to remove acid gas from the input gas stream, receiving water in the dry chemical scrubber;
adjusting a pH level of one or both of the input gas stream and the water with a pH regulator; and
after adjusting the pH level, reacting the acid gas with the media in the dry chemical scrubber.

14. The method of claim 13, wherein adjusting the pH level of the water comprises passing a recycle water line through the pH regulator.

15. The method of claim 13, wherein adjusting the pH level of the water comprises situating the pH regulator in a sump.

16. A method comprising:
receiving an input gas stream at a dry chemical scrubber having media therein, the media to remove acid gas from the input gas stream, the dry chemical scrubber including at least two media layers, the at least two media layers separated from one another and each supported by a plenum layer; and
distributing high pH elements through each of at least two distribution ports, each distribution port dispensing the high pH elements into a different one of the at least two media layers.

17. The method of claim 16, wherein the distributed high pH elements are included in a gaseous vapor that contacts the media in the dry chemical scrubber.

18. The method of claim 16, wherein the distributed high pH elements are included in a liquid solution that contacts the media in the dry chemical scrubber.

19. The method of claim 16, wherein the pH of the first layer is adjusted independently of the second layer.

* * * * *